United States Patent [19]

Osaka et al.

[11] Patent Number: 4,463,376

[45] Date of Patent: Jul. 31, 1984

[54] TELEVISION SIGNAL PROCESSING SYSTEM FOR A WIRELESS PAY SYSTEM

[75] Inventors: Hiroshi Osaka; Akira Honma; Ryokichi Kanai, all of Saitama, Japan

[73] Assignee: Clarion Co., Ltd., Tokyo, Japan

[21] Appl. No.: 516,187

[22] Filed: Jul. 21, 1983

Related U.S. Application Data

[63] Continuation of Ser. No. 219,960, Dec. 24, 1980, abandoned.

[30] Foreign Application Priority Data

Dec. 29, 1979 [JP] Japan ................................ 54-173102

[51] Int. Cl.³ .............................................. H04N 7/16
[52] U.S. Cl. ..................................... 358/120; 358/114
[58] Field of Search ................................. 358/120, 114

[56] References Cited

U.S. PATENT DOCUMENTS 3,081,376 3/1963 Loughlin et al. .................... 358/120
3,439,113 4/1969 Walker ................................ 358/120

Primary Examiner—S. C. Buczinski
Attorney, Agent, or Firm—Harris, Kern, Wallen & Tinsley

[57] ABSTRACT

A television signal processing system characterized in that a level of at least a portion of a blanking interval of a coded television signal is shifted towards a white level and falling of the level shifting interval is shaped into a smooth waveform.

3 Claims, 4 Drawing Figures

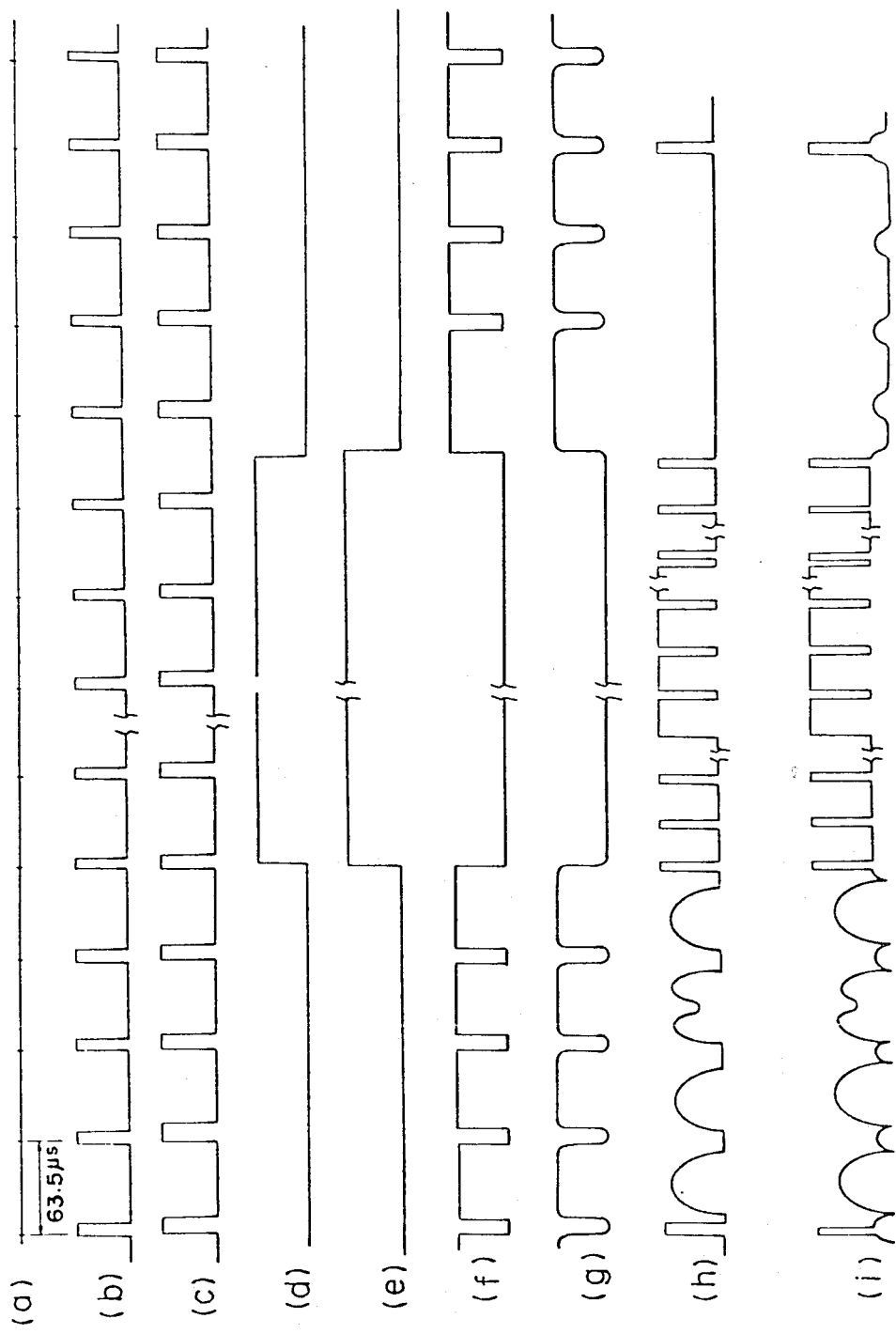

TELEVISION SIGNAL PROCESSING SYSTEM FOR A WIRELESS PAY SYSTEM

This is a continuation of application Ser. No. 219,960, filed Dec. 24, 1980 now abandoned.

BACKGROUND OF THE INVENTION

This invention relates to a television signal processing system, and more particularly to a television signal processing system suitable for a wireless pay-television system in which, to provide special programs only to subscribers who make regular payments for the service, the programs are broadcast in coded or scrambled form requiring a decoding or unscrambling device at the receiver to reproduce the programs on a common TV-set.

A so-called wireless pay-TV system, to which the present invention is applicable, has been developed to eliminate annoying commercial messages indispensable to ordinary commercial broadcasting and possible degradation of program quality due to various restrictions inherent to the commercial broadcasting. This wireless system is expected to be spread wide because expenses and time required for laying cables can be curtailed and there is no limitation in number of subscribers.

In general, in the wireless pay-TV system, a video signal and/or an aural signal is coded or scrambled so that the system may be applied only to the subscribers of the system, excluding non-subscribers.

FIG. 1 shows various signals used in a conventional video signal processing system. According to this system using a waveform of FIG. 1 (a), synchronizing signal components of a television signal are inverted with reference to a pedestal portion thereof as apparent in comparison with a period (about 63.5 µs) of one line shown in FIG. 1 (b), horizontal synchronizing signals are reduced, leaving one per several lines, and amplitude modulation is effected in such a polarity that power is increased in a direction of a white level of a video component.

When the television signal processed in the system as described above is received by a negative-modulation television receiver, which is a standard television receiver in U.S.A. and Japan, a synchronizing separation circuit of the television receiver detects a peak of the video signal in an interval having no horizontal synchronizing signals as shown in FIG. 1 (c). As a result, horizontal synchronism for a picture is lost and the picture becomes a puzzle.

On the other hand, when the coded television signal having the waveform of FIG. 1 (a) is received by a positive-modulation television receiver, a synchronizing separation circuit of the receiver detects a pedestal portion of the coded television signal and outputs signal having a waveform of FIG. 1 (d). This signal is synchronized with the video component so that the picture can be seen in a fairly good condition though some jitter occurs.

The positive-modulation receiver can be easily obtained from the negative-modulation receiver by inverting a polarity of a diode for detecting a video component.

It is to be noted that non-scribers should be excluded in the pay-television system, and therefore it is fatal for the system that the broadcasting program of the system is tapped by simple modification of the existing television set.

SUMMARY OF THE INVENTION

It is therefore an object of the present invention to provide an improved video signal processing system which is capable of scrambling a television signal in such a manner that the picture cannot be caught "legibly" even if a positive-modulation television receiver is used.

In accordance with the present invention, there is provided a television signal processing system which comprises:
a first means for obtaining a pulse signal having a vertical synchronizing pulse interval including equalizing pulses and a horizontal blanking interval from a horizontal drive signal and a vertical drive signal;
a second means for shaping the rising and falling of said pulse signal into a smooth waveform; and
a third means for adding a coded television signal and the output signal from said second means to shift a level of at least a portion of the blanking interval of the television signal towards a white level of a video component.

BRIEF DESCRIPTION OF THE DRAWINGS

FIG. 4 is a waveform diagram of signals at various portions of the circuit illustrated in FIG. 3.

DESCRIPTION OF THE EMBODIMENT

Figure 2:
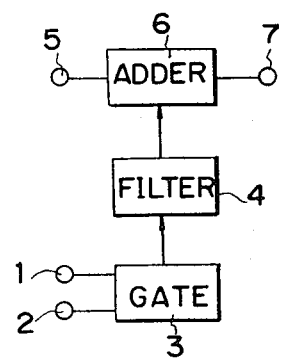
FIG. 2 is a block diagram of one embodiment of the present invention.

The invention will now be described in connection with the embodiment illustrated in the drawings. In FIG. 2, 1 is an input terminal for a horizontal drive signal, 2 is an input terminal for a vertical drive signal, 3 is a gate circuit, 4 is a filter, 5 is an input terminal for a television signal to be coded or scrambled, 6 is an adder and 7 is an output terminal.

Figure 1:
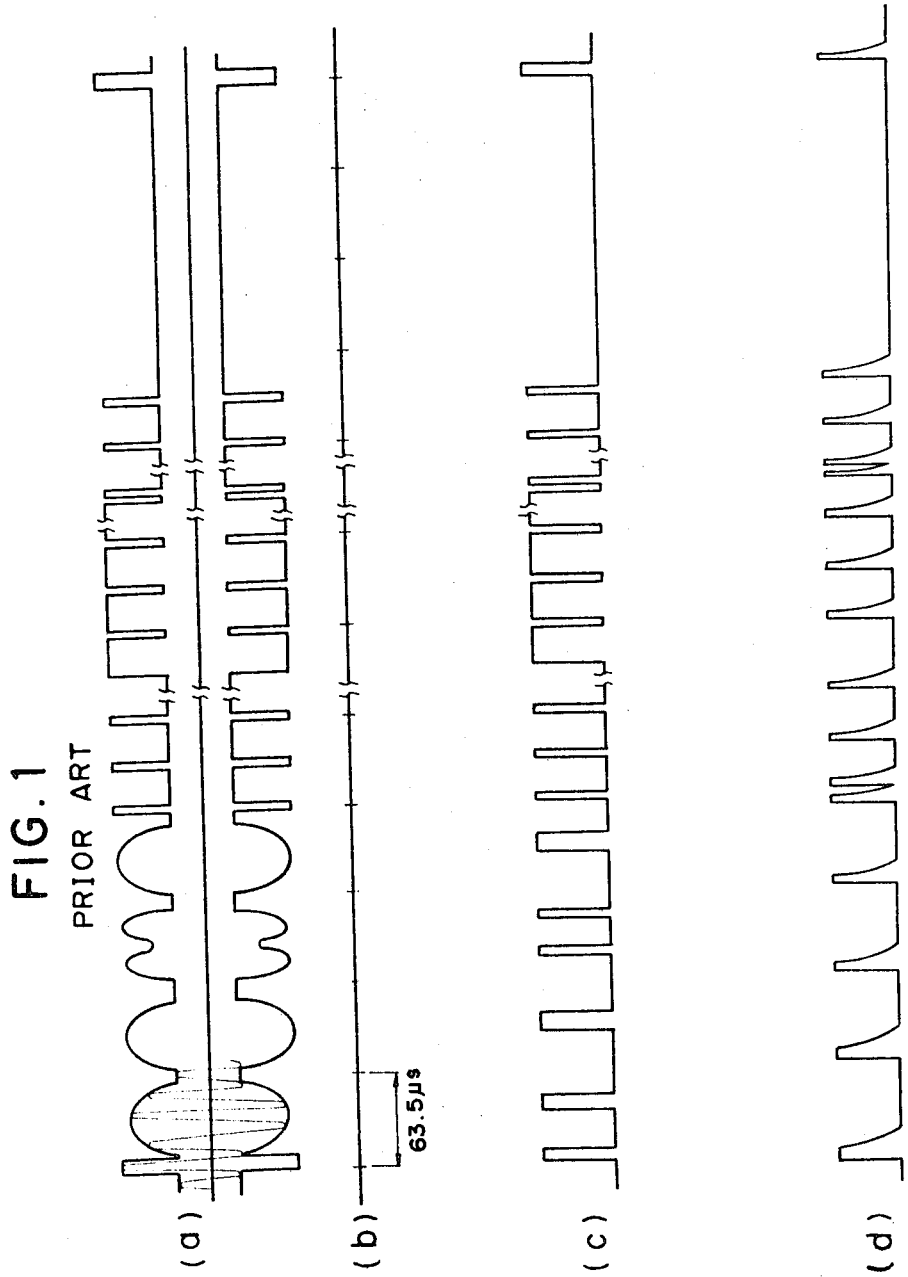
FIG. 1 is a waveform diagram of various signals used in a conventional video signal processing system.

The horizontal drive signal and the vertical drive signal applied to the input terminals 1 and 2, respectively, are supplied to the gate circuit 3 and converted by the gate circuit 3 into a pulse signal having only a vertical synchronizing pulse interval including equalizing pulses and a horizontal blanking interval. This pulse signal is applied to the adder 6 after the leading and trailing edges are approximated, by the filter 4, to a smooth waveform, for example, as a sine wave or a trapezoidal wave. On the other hand, the adder 6 receives, at the input terminal 5 thereof, the television signal after subjected to a scrambling process as illustrated in FIG. 1 (a), and the aforesaid two input signals are added by the adder 6, so that a level of at least a portion of the blanking interval of the video signal, especially the horizontal blanking interval and the vertical synchronizing pulse interval including the equalizing pulses is shifted towards a white level of a video component and the waveforms of the rising and falling of the level shifting are rendered to be of sine waves and smooth.

Figure 3:
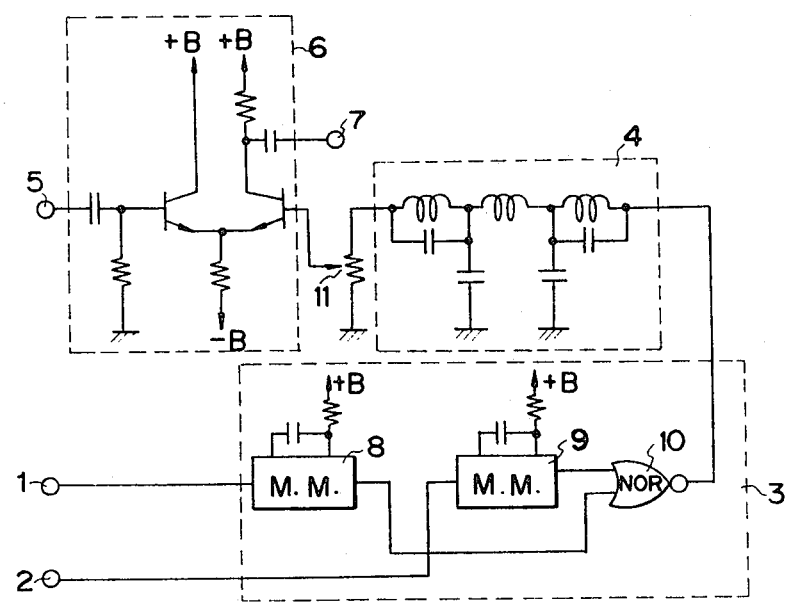
FIG. 3 is a diagram of one example of a concrete circuit of the embodiment illustrated in FIG. 2.

FIG. 3 is a specific circuit for the embodiment of FIG. 2. In FIG. 3, 8 and 9 are monostable multivibrators, 10 is a NOR gate, and 11 is a variable resistor.

The horizontal drive signal of FIG. 4 (b) applied to the input terminal 1 drives the monostable multivibrator 8. The monostable multivibrator 8 generates a pulse having a duration of horizontal blanking as illustrated in FIG. 4 (c), which is applied to one input terminal of the NOR gate 10.

On the other hand, the vertical drive signal of FIG. 4 (d) applied to the input terminal 2 drives the monostable multivibrator 9. The monostable multivibrator 9 generates a pulse whose leading edge is in coincidence with the vertical drive signal and whose trailing edge is in coincidence with a horizontal drive signal first appearing after the equalizing pulses as illustrated in FIG. 4 (e). This pulse is applied to another input terminal of the NOR gate 10.

The NOR gate 10 generates a signal shown in FIG. 4 (f), which is applied to a filter 4. The filter 4 is a low pass filter which attentuates high frequency components of the signal and thereby provides output pulses which more approximate sine waves at the rising and falling portions of the pulses of the NOR gate output signal, as illustrated in FIG. 4 (g). The signal is further subjected to adjustment with respect to an amplitude by the variable resistor 11 and inputted to the adder 6.

The adder 6 receives, at the input terminal 5 thereof, the television signal after subjected to scrambling process as illustrated in FIG. 4 (h) and produces, at the output terminal 7, an output as illustrated in FIG. 4 (i) whose level is shifted as described above.

If the television signal of FIG. 4 (i) processed as described above is amplitude-modulated in such a polarity that a power is increased in the direction of the white level of the video component and received by a positive-modulation television receiver, a waveform near the pedestal portion to be detected by a synchronizing separation circuit of the receiver is too narrow to provide a signal synchronized with the video component. Therefore, horizontal synchronism for a picture is not attained. Since vertical synchronizing interval including equalizing pulses is shifted along with the horizontal blanking interval by the same level, there is caused no problem in a general back-porch clamping operation for clamping the video signal processed in accordance with the system of the invention.

In order to restore the so shifted level into its original level, a circuit similar to the circuit of FIG. 3 is provided in a decoder, and polarities of two input signals to be applied to an adder are inverted from each other to cancel the level shifting. In general, it is desirable that a blanking level shifting signal to be applied to the adder of the decoder be in phase with the corresponding signal for the encoder. In the present invention, however, since the waveform of the level shifting interval is approximated to a smooth waveform such as a sine wave etc., there is no substantial affection, on the decoded waveform, of possible deviation in phases between the encoder and the decoder.

We claim:

1. A television signal processing system which comprises:
    a gate means having horizontal and vertical drive signals as inputs for producing as an output a pulse signal having only vertical blanking pulse intervals including horizontal blanking intervals;
    a filter means having said gate means pulse signal as an input for shaping the rising and falling portions of said pulse signal into a smooth wave form to produce a smoothed pulse signal; and
    an adder means having as inputs said filter means smoothed pulse signal and a television signal so coded that synchronizing signal components thereof are inverted with reference to a pedestal portion thereof for adding said filter means smoothed pulse signal and said coded television signal, to produce a shifted television signal so that a level of at least a portion of the blanking interval of the television signal is shifted towards a white level of a video component and the wave forms of the rising and falling of the level shifting are smoothed.

2. A system according to claim 1, wherein said gate circuit includes a monostable multivibrator to which said horizontal drive signal is inputted and a monostable multivibrator to which said vertical drive signal is inputted and a NOR gate to which outputs from said multivibrators are applied.

3. A system according to claim 1, wherein said filter is a low pass filter for shaping the rising and falling portions of the pulses of said gate means pulse signal to approximate a sine wave.

* * * * *